United States Patent Office 3,364,173
Patented Jan. 16, 1968

3,364,173
PLASTICS STABILIZED WITH METAL SALTS OF SCHIFF BASES
Henryk A. Cyba, Evanston, Ill., assignor to Universal Oil Products Company, Des Plaines, Ill., a corporation of Delaware
No Drawing. Continuation-in-part of application Ser. No. 288,505, June 17, 1963. This application Aug. 24, 1966, Ser. No. 574,553
9 Claims. (Cl. 260—45.75)

ABSTRACT OF THE DISCLOSURE

Stabilization of plastics against deterioration by oxidation and ultraviolet light with nickel and other metal salts of N - (2-hydroxyarylmethylene) - aliphatic amines, such as the nickel salts of N-salicylidene-octadecylamine and N - [(2-hydroxy-4-methoxyphenyl)(phenyl) methylene]-octadecylamine.

---

This is a continuation-in-part of copending application Ser. No. 288,505, filed June 17, 1963, now abandoned, and relates to the stabilization of plastics and more particularly to a novel method of inhibiting deterioration of plastic caused by oxidation and ultraviolet light.

It is well known that most, if not all, plastics undergo deterioration when exposed to sunlight and air. The deterioration due to sunlight and the deterioration due to oxygen are separate phenomena as evidenced by the fact that either one may occur in the absence of the other. It may be that deterioration from one source enhances deterioration from the other source. In any event, it is important that both forms of deterioration be inhibited and the present invention provides a novel method for accomplishing this.

Recent advances in plastic technology have made available a large variety of plastics. A definition of plastic which seems to be accepted in the industry is that plastic comprises a large and varied group of materials which consist of, or contain as an essential ingredient, a substance of high molecular weight which, while solid in the finished state, in some stage in its manufacture is soft enough to be formed into various shapes usually through the application, either singly or together, of heat and pressure. Plastics generally are prepared by the condensation or polymerization of a single monomer or a mixture of monomers. The plastic may be classified further as being thermosetting or thermoplastic. Plastics also include solid polymers, which, in turn, are defined as substances of high molecular weight composed of repeating units and exhibiting unique physical properties including one or more of high tensile strength, elasticity, ability to form fibers, etc. The polymers may be classified into two general types as (1) condensation and (2) addition polymers. The condensation polymers may be formed from a single monomer or from different monomeric reactants. An addition polymer is derived from multiple additions of an unsaturated monomer or monomers. As hereinbefore set forth, most, if not all, plastics undergo deterioration upon exposure to air and ultraviolet light, and the present invention provides a novel method of inhibiting such deterioration.

In a preferred embodiment the plastic comprises a solid olefin polymer. This may comprise homopolymers or copolymers of olefinic hydrocarbons including particularly polyethylene, polypropylene and polybutylene, as well as copolymers of ethylene and propylene, ethylene and butylene and propylene and butylene. In addition, solid polymers prepared from one or more higher molecular weight olefins or mixtures may be stabilized in accordance with the present invention.

Deterioration of the solid olefin polymers when exposed to sunlight is characterized in its early stages by the breaking of the polymer chain and the formation of carbonyl groups. As oxidation continues, the polymer cracks and loses tensile strength to the point of mechanical failure. For example, electrical insulation prepared from solid olefin polymers will undergo embrittlement, increase of power factor and loss of electrical resistance when used in exposed locations. Other examples of the use of solid olefin polymers subject to outdoor exposure are in the preparation of sheets which are used in draping open areas in building construction to order to protect the construction from the effect of weather and in the manufacture of light weight outdoor furniture, cover for greenhouses, awnings, etc. It is readily apparent that the fabricated product must be protected against deterioration caused both by sunlight and air.

Another plastic available commercially on a large scale is polystyrene. Polymerization of styrene proceeds rapidly in an emulsion of 5% sodium oleate solution and results in high molecular weight polymers. In another method styrene is polymerized in the presence of aluminum trialkyls. In general, polystyrene is thermoplastic which, however, may be modified by effecting the polymerization in the presence of a small amount of divinylbenzene. The polystyrene-type resins are particularly useful in the manufacture of molded or machine articles which find application in such goods as windows, optical goods, automobile panels, molded household articles, etc. One disadvantage of polystyrene is its tendency to deteriorate when exposed to direct sunlight and air for extended periods of time.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, etc.

Other plastics being used commercially on a large scale are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), saran (copolymer of vinylidine chloride and vinyl chloride), etc. here again, deterioration of the solid polymer occurs due to ultraviolet light and oxidation.

Still other plastics are prepared from other monomers and are available commercially. Illustrative examples of such other solid polymers include phenolformaldehyde resins, urea-formaldehyde resins, melamine-formaldehyde resins, acryloid plastics which are derived from methyl, ethyl and higher alkyl acrylates and methacrylates as monomers used in the polymerization. Also included in the solid polymers are the polyurethane foams which are becoming increasingly available on a large scale and polyacetals, especially polyformaldehydes.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), Buna N (copolymer of butadiene and acrylonitrile), butyl rubber (copolymer of butadiene and isobutylene), neoprene rubber (chloroprene polymer), Thiokol rubber (polysulfide), silicone rubber, etc. The natural rubbers include hevea rubber, cauotchouc, balata, gutta-percha, etc. It is well known that rubber undergoes deterioration due to oxygen and, when exposed to direct sunlight for extended periods of time, also undergoes deterioration from this source.

In one embodiment the present invention relates to a method of stabilizing plastic normally subject to deterioration by oxidation and UV light which comprises incorporating in said plastic a small but stabilizing concentration of N-(2-hydroxyarylmethylene)-aliphatic amine in which said aliphatic contains at least five carbon atoms and preferably from about eight to about thirty carbon atoms.

In a specific embodiment the present invention relates to a method of stabilizing solid polymer normally subject to deterioration by oxidation and UV light which comprises incorporating in said polymer a small but stabilizing concentration of a nickel salt of N-salicylidene-alkylamine in which said alkyl contains from about eight to about thirty carbon atoms.

In another embodiment the present invention relates to plastic subject to deterioration by oxidation and UV light containing, as an inhibitor against such deterioration, a stabilizing concentration of the inhibitor set forth herein.

It is believed that the inhibitors of the present invention are novel compositions of matter and accordingly are being so claimed in the present application.

The novel inhibitors of the present invention are N-(2-hydroxy-arylmethylene)-aliphatic amines and metal salts thereof. These inhibitors are readily prepared by the reaction of an alkyl or alkenylamine with salicylaldehyde or a substituted salicylaldehyde. This reaction occurs with the liberation of water to form a Schiff's base. In one embodiment the Schiff's base is used as the inhibitor but, in a preferred embodiment, the metal salt of the Schiff's base is used as the inhibitor. When the metal salt is prepared, it preferably is formed by the reaction of two mole proportions of the Schiff's base with one mole proportion of a metal, the latter being reacted as a compound of the metal. The salts also may be expressed as coordination complexes.

Without intending to be limited thereto, it is believed that the metal salts of the Schiff's bases may be illustrated as shown below. The structure shown below is believed to be formed by the reaction of two mole proportions of the Schiff's base, prepared by the reaction of an aliphatic amine with salicylaldehyde, with one mole proportion of a nickel compound.

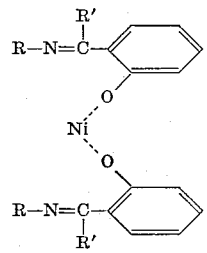

As hereinbefore set forth, R in the above formula is an aliphatic radical containing at least five carbon atoms and preferably from about eight to about thirty carbon atoms. It is understood that the phenyl nucleus and/or methylene group may contain hydrocarbyl and/or hydrocarbyloxy substituents attached thereto. In still another embodiment, 2-hydroxyacylphenones or 2-hydroxybenzophenones are used in place of salicylaldehyde for reaction with the aliphatic amine. Accordingly, R' in the above formula may be alkyl, phenyl, alkylphenyl or alkoxyphenyl as will be described further hereinafter.

As hereinbefore set forth, one of the reactants used in preparing the novel inhibitor of the present invention is an aliphatic amine. It is essential that the aliphatic amine contains at least five carbon atoms and preferably from about eight to about thirty carbon atoms. In a preferred embodiment the aliphatic amine is an alkyl amine containing from about eight to about thirty carbon atoms and includes octylamine, nonylamine, decylamine, undecylamine, dodecylamine, tridecylamine, tetradecylamine, pentadecylamine, hexadecylamine, heptadecylamine, octadecylamine, nonadecylamine, eicosylamine, heneicosylamine, docosylamine, tricosylamine, tetracosylamine, pentacosylamine, hexacosylamine, heptacosylamine, octacosylamine, nonacosylamine, triacontylamine, etc. Conveniently these alkyl amines are prepared from fatty acids and thus include caprylylamine, caprylamine, laurylamine, myristylamine, palmitylamine, stearylamine, arachidylamine, behenylamine, lignocerylamine, cerotylamine, etc.

In another embodiment, but not necessarily with equivalent results, the aliphatic amine is an alkenyl amine and is selected from octenylamine, nonenylamine, decenylamine, undecenylamine, dodecenylamine, tridecenylamine, tetradecenylamine, pentadecenylamine, hexadecenylamine, heptadecenylamine, octadecenylamine, nonadecenylamine, eicosenylamine, hexacosenylamine, heptacosenylamine, octacosenylamine, nonacosenylamine, triacontenylamine, etc. Here again, the amines are conveniently prepared from fatty acids and thus include decylenylamine, dodecylenylamine, palmitoleylamine, oleylamine, recinoleylamine, linoleylamine, linolenylamine, gadoleylamine, cetoleylamine, selacholeylamine, etc.

As stated above, the fatty acid amines are widely available and conveniently used in accordance with the present invention. However, it is understood that secondary alkyl amines, as well as branched chain primary amines also may be used. Illustrative examples of secondary alkyl amines include alpha-alkyl-octylamine, alpha-alkyl-nonylamine, alpha-alkyl-decylamine, alpha-alkyl-undecylamine, alpha-alkyl-dodecylamine, alpha-alkyl-tridecylamine, alpha-alkyl-tetradecylamine, alpha-alkyl-pentadecylamine, alpha-alkyl-hexadecylamine, alpha-alkyl-heptadecylamine, etc., and particularly those of which the alkyl substitutent contains from one to four and still more particularly from one to two carbon atoms as illustrated, for example, in such compounds an alpha-methyl-octylamine, alpha-methyl-undecylamine, alpha-methyl-pentadecylamine, alpha-methyl-heptadecylamine, etc. In still another embodiment, the beta substituted amines are used including, for example, 2-methyl-hexylamine, 2-ethyl-hexylamine, 2-methyl-octylamine, 2-ethyl-octylamine, etc. In general, the branched chain amines preferably contain the branching in the alpha or beta positions.

The aliphatic amine is reacted with salicylaldehyde or a substituted salicylaldehyde. The substituents are selected from hydrocarbyl and hydrocarbyloxy groups selected from alkyl, aralkyl, aryl, alkaryl, alkylcycloalkyl, cycloalkylalkyl, alkoxy, arylalkoxy, aryloxy, alkaryloxy, etc. Particularly preferred reactants in this embodiment include salicylaldehyde and ortho-vanillin (2-hydroxy-3-methoxybenzaldehyde). In another embodiment the substituted salicylaldehyde comprises a 2-hydroxyaryl alkyl ketone as illustrated by 2-hydroxyacetophenone, 2-hydroxypropiophenone, 2-hydroxybutyrophenone, 2 - hydroxyvalerophenone, 2-hydroxycaprylophenone, 2-hydroxylaurylphenone, 2-hydroxypalmitylphenone, etc. In still another embodiment, the substituted salicylaldehyde comprises 2-hydroxybenzophenone, 2-hydroxy-4-alkylbenzophenone, 2-hydroxy-4'-alkylbenzophenone, 2-hydroxy-4-alkoxybenzophenone, 2-hydroxy-4'-alkoxybenzophenone, etc.

The reaction of the aliphatic amine and salicylaldehyde or substituted salicylaldehyde is effected in any suitable manner. While the reaction may be effected at room temperature or slightly above, it generally is preferred to effect the reaction at refluxing conditions. The exact temperature will depend upon the particular solvent employed.

For example, when benzene is used as the solvent, the temperature is about 80° C. Correspondingly higher refluxing temperature are employed when using toluene, xylene, ethyl benzene, cumene, etc., as the solvent. In another embodiment an alcohol solvent is used including methanol, ethanol, propanol, butanol, etc., or other oxygenated solvents as ethers, glycols, etc., may be used. In general, the reaction temperature will be within the range of from room temperature or slightly higher to 200° C. or more. Higher temperatures which may range up to 300° C. may be employed when the reaction is effected under superatmospheric pressure which may range from 10 to 1000 pounds per square inch or more. When desired, the aliphatic amine and/or salicylaldehyde compound may be prepared as separate solutions in a solvent and introduced in this manner into the reaction zone, or either one or both of these compounds may be introduced into the reaction zone and the solvent separately supplied thereto. The refluxing and/or stirring of the heated reactants is continued for a time sufficient to effect substantially complete reaction, which time may range from 0.1 to 10 hours or more. In this reaction, water is formed and preferably is continuously removed from the reaction zone. Following completion of the reaction, the resultant Schiff's base may be separated from the solvent or may be allowed to remain in solution.

In a particularly preferred embodiment the metal salt of the Schiff's base is used as the inhibitor. Any suitable metal salt may be used, the nickel salt being preferred. Other metals include copper, cobalt, lithium, antimony, cadmium, lead, tin, uranium ($UO_2$), vanadium, zinc, iron, mercury, etc. Any suitable metal compound is used in preparing the salt. A preferred compound of nickel is nickel chloride. Other soluble salts of nickel include nickel acetate tetrahydrate, nickel bromide trihydrate, nickel carbonyl, nickel chloride hexahydrate, nickel formate, nickel nitrate hexahydrate, nickel sulfate hexahydrate, etc. A preferred copper compound is cupric acetate hydrate. Other soluble salts of copper include cupric bromide, cupric butyrate, cupric chloride dihydrate, cupric acetoacetate, cupric formate, cupric nitrate trihydrate, cupric nitrate hexahydrate, cupric salicylate, etc. A preferred compound of cobalt is cobaltous sulfate monohydrate. Other soluble compounds of cobalt include cobaltous acetate, cobaltous bromide, cobaltous chloride, cobaltous iodide, cobaltous nitrate, etc.

The Schiff's base is reacted with the metal compound in any suitable manner. For example, the Schiff's base in alcoholic solution is first reacted with an alkali metal hydroxide alcoholic solution and then is reacted with nickel chloride. The reaction temperature generally will be in the range of from about 20° C. to refluxing temperature which may be as high as 200° C. In certain cases, it is unnecessary to first react with an alkali metal hydroxide as, for example, when the lithium salt is prepared. Preferred alkali metal hydroxides comprise sodium hydroxide and potassium hydroxide, although other alkali metal hydroxide solutions may be used, as well as calcium, magnesium, strontium or barium hydroxides.

The aliphatic amine and salicylaldehyde compounds are reacted in equal mole proportions, with the liberation of one mole proportion of water. When desired, an excess of one of the reactants may be present in order to assure complete reaction. The resultant Schiff's base preferably is reacted in a proportion of two moles thereof per one mole of the metal compound. Here again, an excess of one of the reactants may be present to assure complete reaction. The alkali metal hydroxide is used in an equal mole proportion to the Schiff's base, although an excess may be used in order to assure complete reaction.

It is believed that the reaction proceeds first by the formation of the Schiff's base, then the replacement of the hydrogen with the alkali metal on the hydroxyl group and subsequent formation of the metal salt by reaction with the nickel compound. For example, octadecylamine is reacted with salicylaldehyde to form N-salicylidene-octadecylamine. This reacts with sodium hydroxide to form the corresponding salt. Subsequently the sodium is removed by reaction with nickel chloride, for example, to form sodium chloride and the coordination complex or nickel salt.

As hereinbefore set forth, the inhibitors of the present invention are N - (2 - hydroxyarylmethylene) - aliphatic amines and metal salts thereof. Illustrative compounds include N-salicylidene-pentylamine,
N-salicylidene-hexylamine,
N-salicylidene-heptylamine,
N-salicylidene-octylamine,
N-salicylidene-nonylamine,
N-salicylidene-decylamine,
N-salicylidene-undecylamine,
N-salicylidene-dodecylamine,
N-salicylidene-tridecylamine,
N-salicylidene-tetradecylamine,
N-salicylidene-pentadecylamine,
N-salicylidene-hexadecylamine,
N-salicylidene-heptadecylamine,
N-salicylidene-octadecylamine,
N-salicylidene-nonadecylamine,
N-salicylidene-eicosylamine,
N-salicylidene-heneicosylamine,
N-salicylidene-docosylamine,
N-salicylidene-tricosylamine,
N-salicylidene-tetracosylamine,
N-salicylidene-pentacosylamine,
N-salicylidene-hexacosylamine,
N-salicylidene-heptacosylamine,
N-salicylidene-octacosylamine,
N-salicylidene-nonacosylamine,
N-salicylidene-triacontylamine, etc.,
N-salicylidene-pentenylamine,
N-salicylidene-hexenylamine,
N-salicylidene-heptenylamine,
N-salicylidene-octenylamine,
N-salicylidene-nonenylamine,
N-salicylidene-decenylamine,
N-salicylidene-undecenylamine,
N-salicylidene-dodecenylamine,
N-salicylidene-tridecenylamine,
N-salicylidene-tetradecenylamine,
N-salicylidene-pentadecenylamine,
N-salicylidene-hexadecenylamine,
N-salicylidene-heptadecenylamine,
N-salicylidene-octadecenylamine,
N-salicylidene-nonadecenylamine,
N-salicylidene-eicosenylamine,
N-salicylidene-hexacosenylamine,
N-salicylidene-heptacosenylamine,
N-salicylidene-octacosenylamine,
N-salicylidene-nonacosenylamine,
N-salicylidene-triacontenylamine, etc., and corresponding compounds of the alkylamines and alkenyl amines in which the phenyl nucleus and/or methylene group contains a hydrocarbyl or hydrocarbyloxy substituent as hereinbefore described. It is understood that the aliphatic amine may be a straight chain amine or branched in varying degree.

Additional illustrative compounds include
N-[(2-hydroxyphenyl)(methyl)methylene]-octylamine,
N-[(2-hydroxyphenyl)(methyl)methylene]-nonylamine,
N-[(2-hydroxyphenyl)(methyl)methylene]-decylamine,
N - [(2 - hydroxyphenyl)(methyl)methylene] - undecylamine,
N - [(2 - hydroxyphenyl)(methyl)methylene] - dodecylamine,
N - [(2 - hydroxyphenyl)(methyl)methylene] - tridecylamine, N - [(2 - hydroxyphenyl)(methyl)methylene]-tetradecylamine,
N - [(2-hydroxyphenyl)(methyl)methylene]-pentadecylamine,
N - [(2 - hydroxyphenyl)(methyl)methylene]-hexadecylamine,
N - [(2-hydroxyphenyl)(methyl)methylene]-heptadecylamine,
N - [(2 - hydroxyphenyl)(methyl)methylene] - octadecylamine,
N - [(2 - hydroxyphenyl)(methyl)methylene]-nonadecylamine,
N - [(2 - hydroxyphenyl)(methyl)methylene] - eicosylamine,
N - [(2 - hydroxyphenyl)(methyl)methylene]-heneicosylamine,
N - [(2 - hydroxyphenyl)(methyl)methylene] - docosylamine,
N - [(2 - hydroxyphenyl)(methyl)methylene] - tricosylamine,
N - [(2 - hydroxyphenyl)(methyl)methylene]-tetracosylamine,
N - [(2 - hydroxyphenyl)(methyl)methylene]-pentacosylamine,
N - [(2 - hydroxyphenyl)(methyl)methylene]-hexacosylamine,
N - [(2 - hydroxyphenyl)(methyl)methylene]-heptacosylamine,
N - [(2 - hydroxyphenyl)(methyl)methylene] - octacosylamine,
N - [(2 - hydroxyphenyl)(methyl)methylene]-nonacosylamine,
N - [(2 - hydroxyphenyl)(methyl)methylene]-triacontylamine, etc., corresponding compounds in which the alkyl group is replaced by an alkenyl group, corresponding compounds in which the methyl group is replaced by a higher alkyl group selected from ethyl, propyl, butyl, pentyl, hexyl, heptyl, octyl, nonyl, decyl, undecyl, dodecyl, etc. corresponding compounds in which the phenyl nucleus and/or methylene group also contains one or more alkyl, alkoxy, aryloxy and/or cycloalkoxy substituents. The first compound listed above is prepared by the reaction of 2-hydroxyacetophenone with octylamine. The remaining compounds in the above list are prepared in substantially the same manner except that the corresponding reactants will be used. Also, when desired, in place of 2-hydroxyacetophenone, one may use 2-hydroxypropiophenone, 2-hydroxybutyrophenone, etc.

In still another embodiment, the inhibitor is prepared by the reaction of the aliphatic amine with a benzophenone. Illustrative compounds in this embodiment include N-[(2-hydroxyphenyl)(phenyl)methylene]-octylamine,
N-[(2-hydroxyphenyl)(phenyl)methylene]-nonylamine,
N-[(2-hydroxyphenyl)(phenyl)methylene]-decylamine,
N - [(2 - hydroxyphenyl)(phenyl)methylene] - undecylamine,
N - [(2 - hydroxyphenyl)(phenyl)methylene] - dodecylamine,
N - [(2 - hydroxyphenyl)(phenyl)methylene] - tridecylamine,
N - [(2 - hydroxyphenyl)(phenyl)methylene]-tetradecylamine,
N - [(2 - hydroxyphenyl)(phenyl)methylene]-pentadecylamine,
N - [(2 - hydroxyphenyl)(phenyl)methylene]-hexadecylamine,
N - [(2 - hydroxyphenyl)(phenyl)methylene]-heptadecylamine,
N - [(2 - hydroxyphenyl)(phenyl)methylene] - octadecylamine,
N - [(2 - hydroxyphenyl)(phenyl)methylene]-nonadecylamine,
N - [(2 - hydroxyphenyl)(phenyl)methylene] - eicosylamine,
N - [(2 - hydroxyphenyl)(phenyl)methylene]-heneicosylamine,
N - [(2 - hydroxyphenyl)(phenyl)methylene] - docosylamine,
N - [(2 - hydroxyphenyl)(phenyl)methylene] - tricosylamine,
N - [(2 - hydroxyphenyl)(phenyl)methylene]-tetracosylamine,
N - [(2 - hydroxyphenyl)(phenyl)methylene]-pentacosylamine,
N - [(2 - hydroxyphenyl)(phenyl)methylene] - hexacosylamine,
N - [(2 - hydroxyphenyl)(phenyl)methylene]-heptacosylamine,
N - [(2 - hydroxyphenyl)(phenyl)methylene]-octacosylamine,
N - [(2 - hydroxyphenyl)(phenyl)methylene] - nonacosylamine,
N - [(2 - hydroxyphenyl)(phenyl)methylene]-triacontylamine, etc., corresponding compounds in which one or both phenyl groups and/or the methylene group contains one or more alkyl, alkoxy, aryloxy and/or cycloalkoxy substituents. The first compound in the above list is prepared by the reaction of 2-hydroxybenzophenones with octylamine. Here again, the other compounds in the list will be prepared in substantially the same manner except that the corresponding reactants will be used.

As hereinbefore set forth, another embodiment of the invention comprises the metal salts of the specific compounds enumerated above. A preferred metal salt comprises the nickel salt. Other preferred salts comprise the lithium salt, copper salt and cobalt salt. Still other metals have been set forth hereinbefore. In the interest of simplicity, the metal salts of the specific compounds recited above are not repeated here, but it is understood that the metal salts of the specific compounds hereinbefore set forth are definitely comprised as part of the present invention.

From the above description, it will be seen that a number of different compounds and salts thereof may be prepared and used in accordance with the present invention. However, all of these are not necessarily equivalent in the same or different plastic.

In addition to serving to inhibit deterioration of plastic due to oxidation and ultraviolet light, the additives of the present invention also serve as mold release agents, anti-blocking agents, anti-static agents, dyeing aids, etc. These additional advantages are of importance in the manufacture and use of the plastics.

While the compounds described herein are particularly useful for the stabilization of plastics, it is understood that these compounds, including the metal salts, also will have utility in other applications. For example, the metal salts of some of these compounds act as anti-knock agents to increase the anti-knock properties of gasoline. Also, some of these compounds are useful as additives to other organic substrates which may include kerosene, lubricating oil, fuel oil, grease, asphalt, adhesives, paints, etc. The compounds also are useful as catalysts, especially in the formation of acrylic esters from carbon monoxide, acetylene and alcohol.

The inhibitor of the present invention is incorporated in the plastic or other substrate in a stabilizing concentration which may range from about 0.05% to about 10% by weight and preferably from about 0.5% to about 2% by weight of the substrate. The inhibitor may be incorporated in the plastic in any suitable manner and at any suitable stage of preparation. Because the inhibitor may inhibit polymerization of the monomer, it generally is preferred to incorporate the inhibitor after the plastic is formed. In one method the plastic is recovered as powder, pellets, cylinders, spheres, sheets, roll bars, etc., and these may be commingled with the inhibitor in any suitable manner such as by partly melting the plastic and adding the inhibitor to the hot melt. This is readily accomplished, for example, by heating the plastic on a steam heated two-roll mill of conventional commercial design and adding the inhibitor during this operation. The plastic containing the inhibitor is recovered in sheet form and may be fabricated in any desired manner. In another method, the inhibitor is added in a Banbury mixer, an extruder or in any other suitable manner. When fibers are desired, the inhibited plastic is recovered from the Banbury mixer and is extruded through a spinnerette.

The inhibitor is utilized as such or is prepared as a solution in a suitable solvent including alcohols, and particularly methanol, ethanol, propanol, butanol, etc., hydrocarbons and particularly benzene, toluene, xylene, cumene, etc. However, the solvent must not be detrimental to the plastic and, therefore, a preferred solvent comprises the same solvent used during the manufacture or working of the plastic. It is understood that the inhibitor also may be used along with other additives incorporated in plastics for various purposes. For example, in colored plastics carbon black is used in a concentration of below about 5% by weight and generally of from about 1% to about 3% by weight. Similarly, pigments, zinc oxide, titanium oxide, etc., may be incorporated in plastics, the oxides usually being employed in a concentration of from about 2% to about 10% by weight. In many cases, silicates, dyes and/or fillers also are incorporated in the plastic.

It is understood that the inhibitor of the present invention also may be used along with other inhibitors or other ultraviolet light stabilizers. The other inhibitors generally will be of the phenolic or amine type and may include phenyl-alpha-naphthylamine, phenyl-beta-naphthylamine, phenothiazine, dialkylated phenols, trialkylated phenols, alkyl-alkoxyphenols, diphenyl-p-phenylene diamine, 1,1,3-tris - (2-methyl-4-hydroxy-5-t-butylphenyl)-butane, Salol (salicyclic acid esters), p-octylphenyl-salicylate, various phosgene alkylated phenol reaction products, various alkoxy - alkyldihydroxybenzophenones, polyalkyldihydroxybenzophenones, tetrahydroxybenzophenones, 2,4,5-trihydroxybutyrophenone, etc. Other ultraviolet light stabilizers include nickel-bis-dithiocarbonates, nickel-bis-dihydroxypolyalkylphenol sulfides, dilauryl beta-mercaptodipropionate, dihydroxytetraalkyl sulfides, dihydroxytetraalkyl methanes, various trithiophosphites as trilaurylthiophosphite, dialkylphosphites, trialkylphosphites, high molecular weight nitriles, various Mannich bases, etc.

The following examples are introduced to illustrate further the novelty and utility of the present invention but not with the intention of unduly limiting the same.

EXAMPLE 1

The compound of this example is N-salicylidene-octadecylamine and was prepared by the reaction of octadecylamine with salicylaldehyde. The octadecylamine used in this example is a commercial stearylamine marketed under the trade name of Alamine and, upon analysis, was found to contain 3.86 meq./g. of basic nitrogen and has an equivalent weight of 258. This preparation was made by refluxing a mixture of 258 g. (one mole) of the octadecylamine, 122 g. (one mole) of salicylaldehyde and 100 g. of benzene for 8.5 hours. 17.5 cc. of water was collected, which corresponds to the theoretical 18 cc. of water. Following completion of the reaction, the benzene was removed by distillation under vacuum and the N-salicylidene-octadecylamine was recovered as a yellow solid having a melting point of 43–46° C. and a basic nitrogen of 4.59 meq./g.

EXAMPLE 2

This example describes the preparation of the nickel salt of N-salicylidene-octadecylamine, prepared as described in Example 1. The nickel salt was prepared by mixing 36.1 g. (0.1 mole) of the N-salicylidene-octadecylamine with 150 g. of methanol, followed by the gradual addition of 6.5 g. (0.1 mole) of potassium hydroxide dissolved in 75 g. of warm methanol. The mixture was heated to reflux temperature and 11.89 g. (0.05 mole) of nickelous chloride dissolved in 100 g. of warm methanol were gradually added thereto over a period of about one hour. The nickel salt was recovered as a dark green solid having a melting point of 80–82° C. and a nickel content of 7.39%, which corresponds to the theoretical nickel content of 7.5%.

EXAMPLE 3

The compound of this example is N-[(2-hydroxy-4-methoxphenyl)(phenyl)methylene] - octadecylamine and was prepared by the refluxing for three hours of a mixture of 29.4 g. (0.1 mole) of stearylamine, 22.98 g. (0.1 mole) of 2-hydroxy-4-methoxybenzophenone and 200 g. of xylene. 1.4 cc. of water was collected. Following completion of the reaction, the xylene was removed by distillation and the product was recovered by crystallization from methanol as a yellow solid having a melting point of 55–60° C.

EXAMPLE 4

The nickel salt of N-[(2-hydroxy-4-methoxyphenyl)-(phenyl)methylene] - octadecylamine, prepared as described in Example 3, was prepared by mixing and refluxing a mixture of 23.25 g. (0.05 mole of the above Schiff's base and 100 g. of methanol, followed by the gradual addition of 3.25 g. (0.05 mole) of potassium hydroxide dissolved in 50 g. of warm methanol. Then 5.9425 g. (0.025 mole) of nickelous chloride dissolved in 75 g. of warm methanol were added gradually. Refluxing and mixing was continued for a total of two hours and the nickel salt was recovered by vacuum filtration as a green solid having a melting point of 75–77° C. and a nickel content of 6.32% by weight.

EXAMPLE 5

The compound of this example is N-[(2-hydroxy-4-methoxyphenyl)(2 - hydroxyphenyl)methylene]-octadecylamine and was prepared by refluxing a mixture of 29.4 g. (0.1 mole) of stearylamine, 24.4 g. (0.1 mole) of 2,2'-dihydroxy-4-methoxybenzophenone and 200 g. of warm methanol. The reaction time was 2.5 hours. The product was recovered as a pale yellow solid having a melting point of 77–86° C., a basic nitrogen of 2.11 meq./g. and an equivalent weight of 474, which corresponds to the theoretical weight of 495.

EXAMPLE 6

The nickel salt of N-[(2-hydroxy-4-methoxyphenyl)-(2-hydroxyphenyl)methylene] - octadecylamine, prepared as described in Example 5, was prepared by mixing and heating to reflux a mixture of 24 g. (0.05 mole) of the above Schiff's base and 150 g. of methanol, followed by the gradual addition of 6.5 g. (0.1 mole) of potassium hydroxide dissolved in 100 g. of methanol. Then 11.89 g. (0.05 mole) of nickelous chloride dissolved in 100 g. of warm methanol were added gradually to the refluxing mixture. The nickel salt was recovered by vacuum filtration as an olive-drab solid having a melting point of 160–162° C. and a nickel content of 14.85% by weight.

EXAMPLE 7

This example describes the preparation of N-salicylidene-hexadecylamine by refluxing 65.12 g. (0.25 mole) of palmitylamine, 30.5 g. (0.25 mole) of salicylaldehyde and 150 g. of toluene. The amount of water collected was the theoretical 4.5 cc. The product was recovered as a pale yellow precipitate having a melting point of 38–40° C., a basic nitrogen content of 2.84 meq./g. and an equivalent weight of 353, which corresponds to the theoretical weight of 345.

EXAMPLE 8

The nickel salt of N-salicylidene-hexadecylamine was prepared by mixing and refluxing 17.2 g. (0.05 mole) of this Schiff's base and 200 g. of methanol, followed by the gradual addition of 3.25 g. (0.05 mole) of potassium hydroxide dissolved in 75 g. of warm water. This was followed by the gradual addition of 5.95 g. (0.025 mole of nickelous chloride dissolved in 50 g. of warm methanol. The reaction continued for a total of two hours and the nickel salt was recovered by vacuum filtering as a green precipitate having a melting point of 95–97° C. and a nickel content of 7.84%, which corresponds to the theoretical nickel content of 7.85%.

EXAMPLE 9

The compound of this example is N-o-vanilidene-hexadecylamine and was prepared by refluxing for three hours a mixture of 65.12 g. (0.25 mole) of palmitylamine, 38 g. (0.25 mole) of o-vanillin and 150 g. of toluene. The theoretical 4.5 cc. of water was collected. After vacuum filtering recrystallization from methanol, the product was recovered as a pale yellow precipitate having a melting point of 49–50° C. and a basic nitrogen of 2.56 meq./g.

EXAMPLE 10

The nickel salt of N-o-vanillidene-hexadecylamine, prepared as described in Example 9, was prepared by refluxing 37.5 g. (0.1 mole) of this Schiff's base and 150 g. of methanol, followed by the gradual addition of 6.5 g. (0.1 mole) of potassium hydroxide dissolved in 75 g. of methanol and then by the gradual addition of 11.89 g. (0.05 mole) of nickelous chloride dissolved in 100 g. of warm methanol. The nickel salt was recovered as a green solid having a melting point of 102–104° C. and a nickel content of 7.19%, which corresponds to the theoretical nickel content of 7.30%.

EXAMPLE 11

The compound of this example is N-[(2-hydroxyphenyl)(methyl)methylene]-hexadecylamine and was prepared by refluxing 65.12 g. (0.25 mole) of palmitylamine, 34 g. (0.25 mole) of o-hydroxyacetophenone and 200 g. of toluene for seven hours. 4.3 cc. of water was collected. The toluene was removed by vacuum distillation and the product was recovered as a pale yellow solid having a melting point of 67–69° C., a basic nitrogen of 2.74 meq./g. and an equivalent weight of 366, which corresponds to the theoretical weight of 359.

EXAMPLE 12

The nickel salt of the Schiff's base, prepared as described in Example 11, was prepared by mixing and heating to reflux a mixture of 36.6 g. (0.1 mole) of N-[(2-hydroxyphenyl)(methyl)methylene]-hexadecylamine and 200 g. of methanol, followed by the gradual addition of 6.5 g. (0.1 mole) of potassium hydroxide dissolved in 100 g. of methanol and then by the gradual addition of 11.89 g. (0.05 mole) of nickelous chloride dissolved in 100 g. of warm methanol. The nickel salt was recovered by vacuum filtering as an olive colored precipitate having a melting point of 115–117° C. and a nickel content of 8.80%.

EXAMPLE 13

N-salicylidene-tetradecylamine was prepared by refluxing 106.5 g. (0.5 mole) of tetradecylamine, 61 g. (0.5 mole) of salicylaldehyde and 200 g. of benzene for twelve hours. The product was recovered as yellow solid having a melting point of 39–40° C. and a basic nitrogen of 3.02 meq./g.

EXAMPLE 14

The nickel salt of N-salicylidene-tetradecylamine, prepared as described in Example 13, was prepared by refluxing a mixture of 31.7 g. (0.1 mole) of this Schiff's base and 200 g. of methanol, followed by the gradual addition of 6.5 g. (0.1 mole) of potassium hydroxide dissolved in 100 g. of warm methanol and then by the gradual addition of 11.89 g. (0.05 mole) of nickelous chloride dissolved in 100 g. of warm methanol. The nickel salt was recovered as a green precipitate having a melting point of 69–71° C. and a nickel content of 8.58%, which corresponds to the theoretical nickel content of 8.42%.

EXAMPLE 15

The compound of this example is N-salicylidene-decylamine and was prepared by refluxing a mixture of 157 g. (1 mole) of isodecylamine, 122 g. (1 mole) of salicylaldehyde and 200 g. of benzene for eight hours. 17 cc. of water was collected. The Schiff's base was recovered as an orange oil having a basic nitrogen of 3.74 meq./g. and an equivalent weight of 267, which corresponds to the theoretical weight of 261.

EXAMPLE 16

The nickel salt of N-salicylidene-decylamine, prepared as described in Example 15, was prepared by stirring a mixture of 26.1 g. (0.1 mole) of this Schiff's base with 200 g. of methanol, then gradually adding 6.5 g. (0.1 mole) of potassium hydroxide dissolved in 100 g. of warm methanol and finally adding gradually 11.89 g. (0.05 mole) of nickelous chloride dissolved in 100 g. of warm methanol. The nickel salt was recovered as a dark green oil having a nickel content of 8.84% by weight.

EXAMPLE 17

The compound of this example is N-salicylidene-octylamine and is prepared by reacting one mole proportion of octylamine with one mole proportion of salicylaldehyde in benzene solvent. Following completion of the reaction, the Schiff's base separated from the solvent.

EXAMPLE 18

The compound of this example is N-[(2-hydroxyphenyl)(methyl)methylene]-hexylamine and is prepared by reacting equal mole proportions of hexylamine and acetophenone under refluxing conditions in the presence of benzene solvent. The refluxing is continued until the theoretical amount of water is collected and the Schiff's base then is recovered by removing the solvent by vacuum distillation.

EXAMPLE 19

The compound of this example is N-[(2-hydroxyphenyl)(phenyl)methylene]-pentylamine and is prepared by refluxing equal mole proportions of pentylamine and benzophenone in the presence of benzene solvent until the theoretical amount of water is collected. The Schiff's base is recovered by vacuum distillation to remove the solvent.

EXAMPLE 20

The nickel salt of N-salicylidene-octadecylamine, prepared as described in Example 2, was evaluated as an inhibitor in a special batch of commercial solid polypropylene. This special batch of solid polypropylene was obtained free of any inhibitors in order that it may be used as a proper control sample to evaluate the effect of different inhibitors.

The solid polypropylene used in this example is stated to have the following properties:

TABLE I

| | |
|---|---|
| Specific gravity | 0.910–0.920 |
| Refractive index, $n_D^{25}$ | 1.510 |
| Heat distortion temperature: | |
| At 66 p.s.i. load ° F | 240 |
| At 264 p.s.i. load ° F | 150 |
| Tensile yield strength, p.s.i. (ASTM D-638-58T) (0.2" per min.) | 4700 |
| Total elongation, percent | 300–400 |
| Stiffness flexural (ASTM D747-50) $10^5$ p.s.i. | 1.8 |
| Shore Hardness (ASTM D676-55T) | 74D |

In one method the solid polypropylene was evaluated in an Atlas type DL-TS Weather-Ometer. The Weather- Ometer may be operated with or without the use of water sprays to simulate accelerated moist weathering. In the present runs, the water sprays were not used, thereby simulating and accelerating the effect of hot airy weathering. Polypropylene pellets were milled in a two-roll heated mill of conventional commercial design and the inhibitor was incorporated in the samples during the milling. The samples were pressed into sheets of 17 mil. thickness and cut into plaques of 1⅜″ x 1½″. The plaques then were inserted into plastic holders, affixed onto a rotating drum and exposed to carbon arc rays at about 52° C. in the Weather-Ometer. Periodically samples of the polypropylene were subjected to infrared analysis and the intensity of the carbonyl band at 1715 cm.$^{-1}$ was determined and expressed as "carbonyl number." As hereinbefore set forth, the formation of carbonyl groups is an indication of deterioration of the polyolefin. The higher intensity of the carbonyl band indicates a higher carbonyl concentration (expressed as carbonyl number) and accordingly increased deterioration. The number of hours required to effect an increase in carbonyl content of 100 numbers is taken as the Induction Period.

Samples of the polypropylene also were evaluated by outdoor exposure. The plaques of polypropylene prepared in the above manner were exposed to weathering on an outdoor rack facing south and inclined at a 45° angle at Des Plaines, Ill. The samples were analyzed for carbonyl formation in the manner described in the previous paragraph. Here again, the number of days required to effect an increase in carbonyl content of 100 numbers is taken as the Induction Period.

The results of evaluations in the Weather-Ometer and outdoor exposure are reported in the following table for a sample of the polypropylene without added inhibitor and for a sample containing 1% by weight of the nickel salt of N-salicylidene-octadecylamine.

TABLE 2

| Additive | Weather-Ometer Induction Period (Hours) | Outdoors Induction Period (Days) |
| --- | --- | --- |
| None | <48 | <54 |
| 1% by wt. of nickel salt of N-salicylidene-octadecylamine | 1,368 | >170 |

From the data in the above table, it will be seen that this inhibitor was effective in retarding deterioration of the polypropylene. In fact, the sample exposed outdoors had increased from an initial carbonyl reading of 172 to a carbonyl reading of only 190 after 170 days. Accordingly, this evaluation is being continued because a differential carbonyl content of 100 numbers has not as yet been reached.

EXAMPLE 21

The nickel salt of N-[(2-hydroxy-4-methoxyphenyl)-(phenyl)methylene] - octadecylamine, prepared as described in Example 4, also was evaluated in another sample of the polypropylene described in Example 20. The results of these evaluations are reported in the following table. For comparative purposes, the results obtained when evaluating the polypropylene without the inhibitor are repeated in the table.

TABLE 3

| Additive | Weather-Ometer Induction Period (Hours) | Outdoors Induction Period (Days) |
| --- | --- | --- |
| None | <48 | <54 |
| 1% by wt. of nickel salt of N-[(2-hydroxy-4-methoxyphenyl)(phenyl)-methylene]-octadecylamine | 1,944 | >233 |

Here again, it will be seen that the inhibitor of the present invention was effective in inhibiting deterioration of the polypropylene.

EXAMPLE 22

The nickel salt of N-o-vanillidene-hexadecylamine, prepared as described in Example 10, also was evaluated in another sample of the polypropylene described in Example 20. The results of these evaluations are reported in the following table. Here again, the results of the evaluations made using the polypropylene without the inhibitor are repeated for comparative purposes.

TABLE 4

| Additive | Weather-Ometer Induction Period (Hours) | Outdoors Induction Period (Days) |
| --- | --- | --- |
| None | <48 | <54 |
| 1% by wt. of nickel salt of N-[(2-hydroxy-4-methoxyphenyl)(phenyl)-methylene]-octadecylamine | 1,800 | >381 |

The sample of polypropylene containing the inhibitor which was evaluated outdoors had developed an increase in carbonyl content from an original reading of 159 to a reading of 227 after 381 days. Because this sample had not developed an increase of 100 numbers in carbonyl content, the evaluation is being continued.

EXAMPLE 23

This example reports evaluations made in a special batch of solid polyethylene. As hereinbefore set forth, a special batch of the solid polyolefin was obtained free of any inhibitors in order that it may be used as a proper control sample to evaluate the effect of different inhibitors. The solid polyethylene is of the high density type and the inhibited product is marketed commercially.

A sample of the polyethylene without inhibitor and a sample of the polyethylene containing 1% by weight of the nickel salt of N-[(2-hydroxy-4-methoxyphenyl) (phenyl)-methylene]-octadecylamine, prepared as described in Example 4, were evaluated in both the Weather-Ometer and in outdoor exposure in the same manner as described in Example 20. The results of these tests are reported in the following table.

TABLE 5

| Additive | Weather-Ometer Induction Period (Hours) | Outdoors Induction Period (Days) |
| --- | --- | --- |
| None | 192 | 42 |
| 1% by wt. of nickel salt of N-[(2-hydroxy-4-methoxyphenyl)(phenyl)-methylene]-octadecylamine | 2,928 | >381 |

The sample of polyethylene containing inhibitor which was exposed outdoors had not developed an increase in carbonyl reading of 100 hours and accordingly this test is being continued.

EXAMPLE 24

The nickel salt of N-salicylidene-hexadecylamine, prepared as described in Example 8, also was evaluated in another sample of the polyethylene described in Example 23. The results of these evaluations are reported in the following table, which also repeats the results obtained when using a sample of the polyethylene free of added inhibitor.

TABLE 6

| Additive | Weather-Ometer Induction Period (Hours) | Outdoors Induction Period (Days) |
| --- | --- | --- |
| None | 192 | 42 |
| 1% by wt. of nickel salt of N-salicylidene-hexadecylamine | 3,552 | >400 |

The sample of polyethylene containing inhibitor which was exposed outdoors had increased in carbonyl reading from an initial of 60 to only 89 after 400 days outdoors. Accordingly, this evaluation is still being continued.

EXAMPLE 25

The nickel salt of N-o-vanillidene-hexadecylamine, prepared as described in Example 10, also was evaluated in another sample of the polyethylene described in Example 23, with the following results:

TABLE 7

| Additive | Weather-Ometer Induction Period (Hours) | Outdoors Induction Period (Days) |
|---|---|---|
| None | 192 | 42 |
| 1% by wt. of nickel salt of N-o-vanillidene-hexadecylamine | 2,448 | >364 |

The sample containing inhibitor exposed outdoors increased in carbonyl content from an initial reading of 29 to a reading of 57 after 364 days and the evaluation is being continued.

EXAMPLE 26

This example reports the results of evaluations made in a commercially available low density polyethylene. These evaluations were made in the same manner described in Example 20. The results of tests made with a sample of the polyethylene without the inhibitor and with a sample of the polyethylene containing the inhibitor are reported in the following table.

TABLE 8

| Additive | Weather-Ometer Induction Period (Hours) | Outdoors Induction Period (Days) |
|---|---|---|
| None | 96 | 28 |
| 1% by wt. of nickel salt of N-[(2-hydroxy-4-methoxyphenyl)(phenyl)-methylene]-octadecyl-amine | 1,776 | 241 |

From the data in the above table, it will be seen that the inhibitor was effective in retarding deterioration of the polyethylene.

EXAMPLE 27

The nickel salt of N-salicylidene-hexadecylamine, prepared as described in Example 8, also was evaluated in another sample of the polyethylene described in Example 26, with the following results:

TABLE 9

| Additive | Weather-Ometer Induction Period (Hours) | Outdoors Induction Period (Days) |
|---|---|---|
| None | 96 | 28 |
| 1% by wt. of nickel salt of N-salicylidene-hexadecylamine | 2,448 | 194 |

While the results obtained in the sample evaluated outdoors using 1% by weight of the inhibitor are not as effective as obtained with other inhibitors of the present invention, it is interesting to note that another sample of the same polyethylene which contained only 0.075% by weight of this inhibitor also had an Induction Period of about 194 days when exposed outdoors.

EXAMPLE 28

As hereinbefore set forth, the inhibitor of the present invention may be used along with other additives. For example, when another sample of the polypropylene described in Example 20 containing 1% by weight of the nickel salt of N-salicylidene-hexadecylamine, prepared as in Example 8, was evaluated in the Weather-Ometer, the Induction Period was about 1392 hours. However, another sample of the same polypropylene containing both 1% by weight of N-salicylidene-hexadecylamine and 0.15% by weight of N,N'-dicyclohexylamino-diphenylmethane, the Induction Period was increased to about 1800 hours.

EXAMPLE 29

The nickel salt of N-salicylidene-hexadecenylamine is prepared by the reaction of oleylamine and salicylaldehyde, followed by reaction with sodium hydroxide and nickelous chloride in substantially the same manner as heretofore described. The nickel salt is used as an inhibitor in solid polybutylene. The inhibitor is incorporated by hot melt addition of the inhibitor to the polybutylene being heated and pressed on a conventional two-roll steam heated mill. The polybutylene sheets then are heat-compressed to a thickness of 20 mils, cut into plaques of 1½" x 1½" and mounted in plastic holders. The plaques are evaluated both in the Weather-Ometer and by outdoor exposure in the manner hereinbefore described in detail. The addition of the inhibitor serves to effectively inhibit carbonyl development.

EXAMPLE 30

The nickel salt of N-o-vanillidene-hexadecylamine, prepared as described in Example 10, is used as an inhibitor in polystyrene. The inhibitor is incorporated in a concentration of 0.5% by weight in polystyrene by partly melting the polystyrene and incorporating the inhibitor in the hot melt. The polystyrene containing the inhibitor is of improved resistance to deterioration by ultraviolet light and due to oxidation.

EXAMPLE 31

The nickel salt of N-[2-hydroxy-4-methoxyphenyl)-(phenyl)methylene] - octadecylamine, prepared as described in Example 4, is used as an inhibitor in polyvinyl chloride plastic. Here again, the inhibitor is incorporated by partly melting the polyvinyl chloride plastic and incorporating the inhibitor in the hot melt in a concentration of 1% by weight. This serves to inhibit deterioration of the polyvinyl chloride plastic due to ultraviolet light and oxidation.

EXAMPLE 32

The nickel salt of N-salicylidene-tetradecylamine, prepared as described in Example 14, is used in a concentration of 0.5% by weight in Nylon. The inhibitor is incorporated in a Banbury mixer and the Nylon is formed into fibers in a spinnerette. This serves to inhibit deterioration of the Nylon due to ultraviolet light and oxidation.

I claim as my invention:

1. Plastic, normally subject to deterioration by oxidation and ultraviolet light containing, as an inhibitor against said deterioration, a small but stabilizing concentration of a metal salt of an N-(2-hydroxyphenylmethylene)-aliphatic amine in which said aliphatic group contains at least five carbon atoms and in which the methyl is selected from the group consisting of nickel, copper, cobalt, lithium, antimony, cadmium, lead, tin, uranium ($UO_2$), vanadium, zinc, iron and mercury.

2. The composition of claim 1 wherein the metal of said metal salt is nickel.

3. The composition of claim 1 further characterized in that said plastic is a solid polyolefin.

4. The composition of claim 3 wherein inhibitor is a metal salt of N-salicylidene-alphatic amine in which said aliphatic group contains from about 8 to about 30 carbon atoms.

5. The composition of claim 4 wherein said inhibitor is a nickel salt of said N-salicylidene-alphatic amine.

6. The composition of claim 4 wherein said amine is N-salicylidene-alkylamine having from about 8 to about 30 carbon atoms in said alkyl.

7. The composition of claim 6 wherein said inhibitor is a nickel salt of said N-salicylidene-alkylamine.

8. The composition of claim 3 wherein said inhibitor is a metal salt of N-[(2-hydroxyphenyl)(methyl)methylene]-aliphatic amine in which said aliphatic contains at least 5 carbon atoms.

9. The composition of claim 3 wherein said inhibitor is a metal salt of N-[(2-hydroxyphenyl)(phenyl)methylene]-alkylamine in which said alkyl contains at least 5 carbon atoms.

References Cited

FOREIGN PATENTS 1,147,753   4/1963   Germany.

DONALD E. CZAJA, *Primary Examiner.*

V. P. HOKE, *Assistant Examiner.*